United States Patent [19]

Yasui et al.

[11] Patent Number: 5,683,300
[45] Date of Patent: Nov. 4, 1997

[54] DRIVE SHAFT MADE OF FIBER REINFORCED COMPOSITE MATERIAL AND METHOD OF MANUFACTURING THE SAME

[75] Inventors: Yoshiharu Yasui; Yasuki Miyashita; Meiji Anahara; Yasuya Mita, all of Kariya, Japan

[73] Assignee: Kabushiki Kaisha Toyoda Jidoshokki Seisakusho, Kariya, Japan

[21] Appl. No.: 388,801

[22] Filed: Feb. 15, 1995

[30] Foreign Application Priority Data

Feb. 17, 1994 [JP] Japan ................ 6-020650

[51] Int. Cl.⁶ ................................................. F16C 3/00
[52] U.S. Cl. .................. 464/181; 242/447.1; 464/183
[58] Field of Search ................................ 464/134, 179, 464/181, 182, 183; 242/7.21, 7.22, 447.1

[56] References Cited

U.S. PATENT DOCUMENTS

| | | | |
|---|---|---|---|
| 3,592,884 | 7/1971 | Williams | 464/181 X |
| 4,118,262 | 10/1978 | Abbott | 242/7.21 X |
| 4,380,443 | 4/1983 | Federmann et al. | |
| 4,421,497 | 12/1983 | Federmann et al. | |
| 4,605,385 | 8/1986 | Pück et al. | 464/181 |
| 4,664,644 | 5/1987 | Kumata et al. | 464/181 X |
| 4,681,556 | 7/1987 | Palmer | |
| 4,773,891 | 9/1988 | Hoffmann | 464/181 |
| 5,261,991 | 11/1993 | Zackrisson et al. | 464/903 X |
| 5,342,464 | 8/1994 | McIntire et al. | 464/183 X |
| 5,397,272 | 3/1995 | Smiley et al. | 464/181 |
| 5,474,630 | 12/1995 | Rouillot | 464/903 X |

FOREIGN PATENT DOCUMENTS

| | | |
|---|---|---|
| 0301631 | 2/1989 | European Pat. Off. |
| 0321228 | 6/1989 | European Pat. Off. |
| 2080428 | 10/1971 | France |
| 2452630 | 10/1980 | France |
| 3321349 | 12/1984 | Germany |
| 3517681 | 11/1986 | Germany |
| 54-139 | 1/1979 | Japan |
| 54-65242 | 5/1979 | Japan |
| 1228829 | 9/1989 | Japan |
| 1228830 | 9/1989 | Japan |
| 3204416 | 6/1991 | Japan |
| 5193381 | 3/1993 | Japan |
| 40-5087118 | 4/1993 | Japan ................ 464/181 |
| 694024 | 4/1994 | Japan |
| 2146097 | 4/1985 | United Kingdom ........... 464/181 |
| 2187819 | 9/1987 | United Kingdom |

*Primary Examiner*—Daniel P. Stodola
*Assistant Examiner*—Eileen A. Dunn
*Attorney, Agent, or Firm*—Brooks Haidt Haffner & Delahunty

[57] ABSTRACT

A drive shaft having a body section and a yoke section formed with at least one end of the body section. A hole is formed in the yoke section. The body section and yoke section are integrally made of a fiber reinforced composite material including a filament and a plastic adhered to the filament. The shaft comprises a plurality of shaft fiber layers forming the body section. Each shaft fiber layer includes a plurality of shaft fiber elements being arranged at predetermined intervals. A plurality of yoke fiber layers form the yoke section. Each yoke fiber layer includes a plurality of yoke fiber elements. Each yoke fiber element has ends connected to each shaft fiber element. Each yoke fiber element has either a closed loop arrangement (CLA) or an open loop arrangement (OLA). The CLA is defined by the yoke fiber elements forming closed loops around the hole. The OLA is defined by the yoke fiber elements forming open loops around the hole.

25 Claims, 13 Drawing Sheets

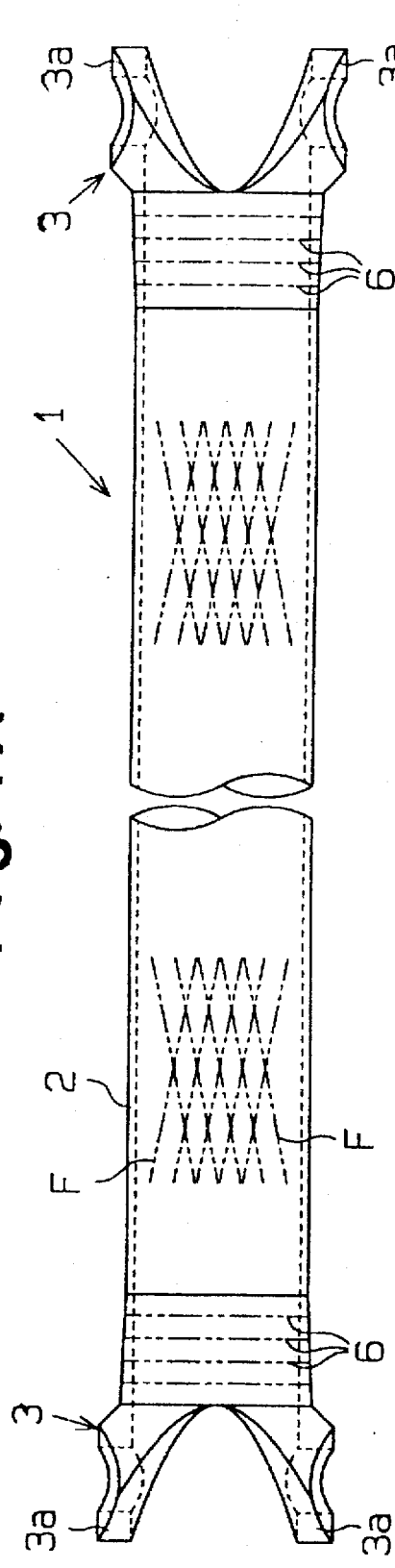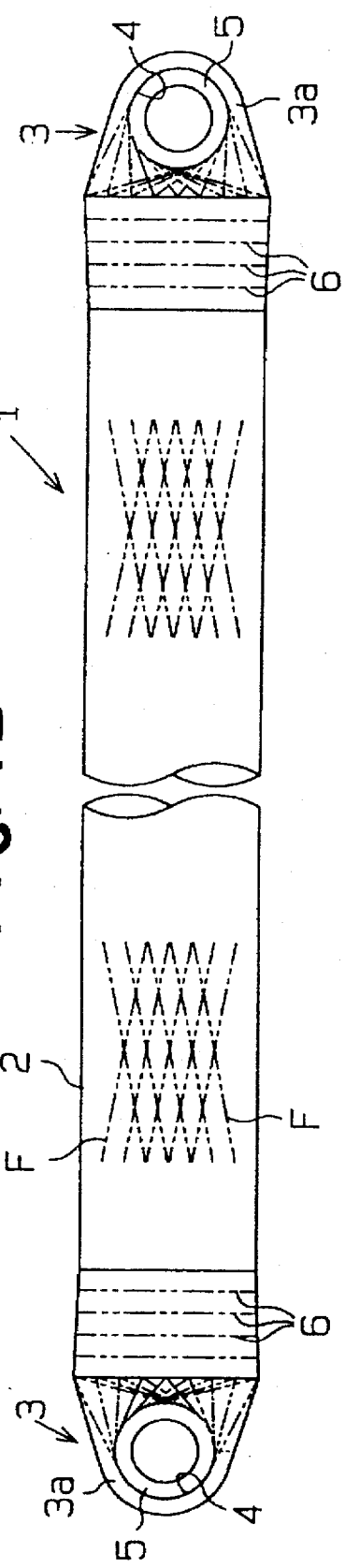

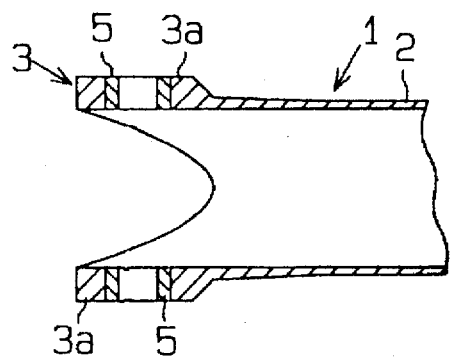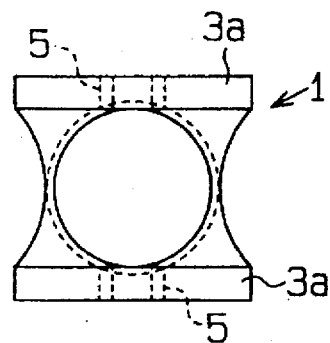
Fig. 17A    Fig. 17B
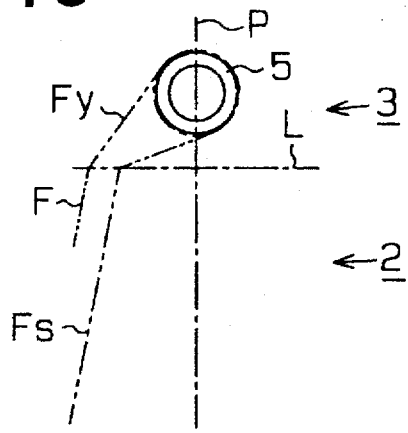
Fig. 18
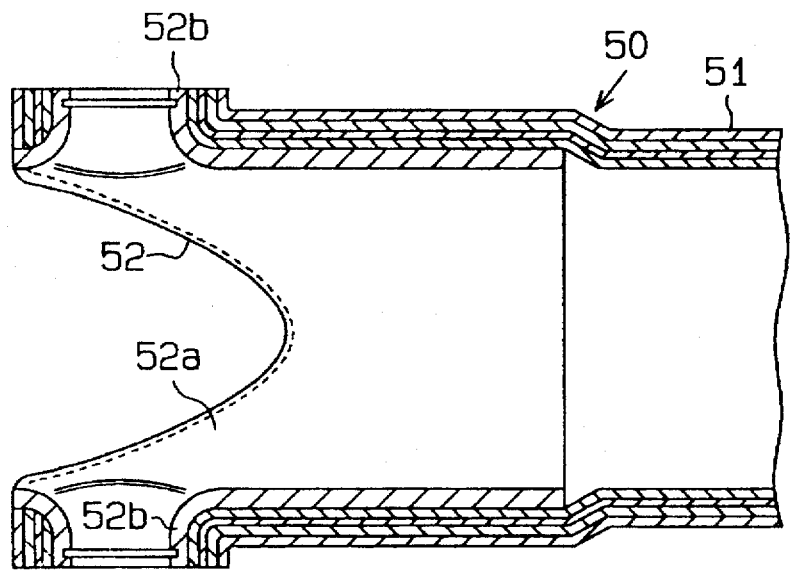
Fig. 19 (Prior Art)

DRIVE SHAFT MADE OF FIBER REINFORCED COMPOSITE MATERIAL AND METHOD OF MANUFACTURING THE SAME

BACKGROUND OF THE INVENTION

1. Field of the Invention

The present invention relates to a drive shaft made of a fiber reinforced composite material suitable for the propeller shaft of a vehicle.

2. Description of the Related Art

The output of a transmission in an automobile is transmitted via a propeller shaft to a differential gear. The propeller shaft has yokes at both end portions which are coupled via universal joints (mainly spider joints) to the transmission and differential gear, respectively. To enhance the twisting and bending durabilities and reduce the weight of the propeller shaft, yokes are generally welded to the respective ends of its body section, which is made of a metal pipe. Even the light propeller shaft of a metal-pipe, if long, should be divided by two (three joint system) or by three (four joint systems) in consideration of the critical speed. In this case, the number of joints, the number of parts and the number of assembling steps increase, resulting in a higher cost. Further, the number of parts which are to be assembled to the body of a vehicle and the number of assembling steps also increase.

As a solution to the above shortcoming, a propeller shaft having a body section formed of fiber reinforced plastics (FRP) has been proposed. This material reduces the overall weight and a shaft made of this material does not need to be divided even if it is long. For example, Japanese Unexamined Patent Publication No. hei 5-193381, U.S. Pat. No. 4,380,443, U.S. Pat. No. 4,421,497 and U.S. Pat. No. 4,681,556 disclose such shafts. Those propeller shafts comprise an FRP body section and metal yokes secured to both ends of the body section.

In the propeller shaft described in the Japanese Unexamined Patent Publication No. hei 5-193381, after the FRP body section is formed, the metal yokes are fitted over the end portions of the body section and are secured there by an adhesive. The propeller shafts described in U.S. Pat. Nos. 4,380,443 and 4,421,497 have metal rings securely fitted in the end portions of the FRP body section. The end portions of the metal yokes are fitted in and welded to the metal rings. In U.S. Pat. No. 4,380,443, multiple pins penetrating through the body section and protruding therefrom are fixed to the metal rings to prevent the relative movement of the body section to the metal rings. In U.S. Pat. No. 4,421,497, threads are formed on the outer surfaces of the metal rings to prevent the relative movement of the body section to the metal rings.

In U.S. Pat. No. 4,681,556, metal yoke members 52 are provided at both ends (only one shown) of a propeller shaft 50 as shown in FIG. 19. Each yoke member 52 comprises a hollow spigot portion 52a extending in the same axial direction as a body section 51 and a pair of ring-shaped transverse tubular portions 52b integrally formed at the tip of the spigot portion 52a. The outer surface of each yoke member 52 is coated with an FRP.

In the conventional FRP propeller shafts, the body section and the yokes are made of differing materials and have different coefficients of thermal expansion. The body section and each yoke are joined at their interfaces by an adhesive or press fitting so that the parts, having different coefficients of thermal expansion, do not move relative to each other. This applies stress to the junctions of the body section and the yokes, causing fatigue and shortening the shaft's life as compared with a propeller shaft which is made entirely of the same material. In addition, because the yokes are made of metal, the propeller shafts are heavy.

SUMMARY OF THE INVENTION

Accordingly, it is a primary objective of the present invention to provide a drive shaft which has higher durability and reliability, and can be lighter, than the conventional FRP propeller shaft.

It is another objective of the present invention to provide a method of manufacturing the drive shaft.

To achieve the above objects, the present invention is provided with a shaft having a body section and a yoke section formed with at least one end of the body section. The yoke section has a hole. The body section and yoke section are integrally made of a fiber reinforced composite material including a filament and a plastic adhered to the filament. The shaft comprises a plurality of shaft fiber layers forming the body section. Each shaft fiber layer includes a plurality of shaft fiber elements being arranged at predetermined intervals. A plurality of yoke fiber layers form the yoke section. Each yoke fiber layer includes a plurality of yoke fiber elements. Each yoke fiber element has opposite ends connected to associated shaft fiber elements. Each yoke fiber element has at least one of a closed loop arrangement (CLA) and an open loop arrangement (OLA). The CLA is defined by the yoke fiber elements forming closed loops around the hole. The OLA is defined by the yoke fiber elements forming open loops around the hole.

BRIEF DESCRIPTION OF THE DRAWINGS

The invention, together with objects and advantages thereof, may best be understood by reference to the following description of the presently preferred embodiments together with the accompanying drawings in which:

FIG. 1A is a schematic side view and FIG. 1B is a schematic plan view, both showing a first embodiment of the present invention as applied to a propeller shaft of a vehicle;

FIGS. 13A and 13B illustrate a tenth embodiment, FIG. 13A being a partial schematic development view showing filaments in an open loop arrangement while FIG. 13B is a partial schematic development view showing filaments in a closed loop arrangement;

FIG. 17A is a partial cross-sectional view of a propeller shaft according to a still further modification, and FIG. 17B is a front view of the propeller shaft;

FIG. 18 is a partial schematic view showing an open loop arrangement according to a still further modification; and FIG. 19 is a partial cross-sectional view showing a propeller shaft according to prior art.

DETAILED DESCRIPTION OF THE PREFERRED EMBODIMENTS

First Embodiment

Figure 2A:
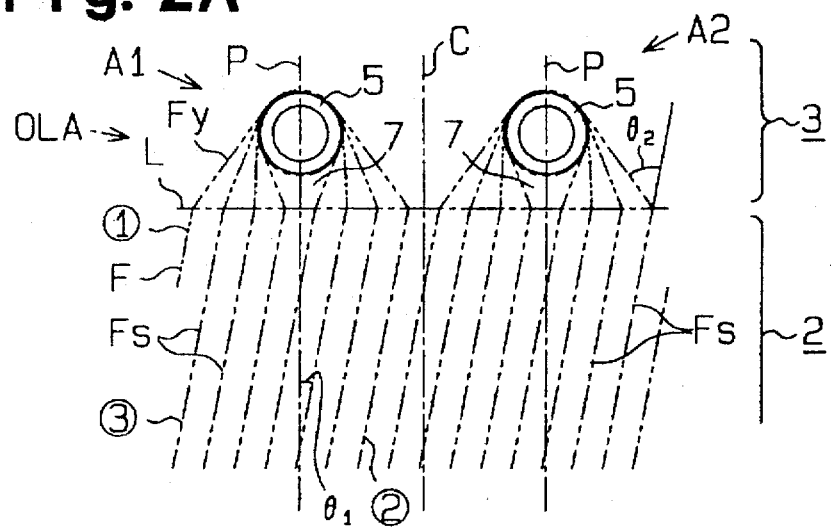
FIG. 2A is a partial schematic development view showing a filament layer in an open loop arrangement.

A propeller shaft according to a first embodiment of the present invention will be described with reference to FIGS. 1 through 4. As shown in FIG. 1, a propeller shaft 1 of a vehicle has a cylindrical body section 2 and a pair of yoke sections 3, one formed on each end of the body section 2. The body section 2 and the yoke sections 3 are integrally formed of fiber reinforced plastics (FRP). Each yoke section 3 has a pair of support pieces 3a with a hole 4 formed in each support piece 3a. The axis of each hole 4 is perpendicular to the axis of the body section 2. A metal bushing 5 is securely fitted in each hole 4.

The propeller shaft 1 of this embodiment is formed by folding a single filament F at the yoke sections 3 in such a way that a plurality of filament layers are formed at the yoke sections 3 and the body section 2. The filament F need not be a continuous single filament, but a plurality of filaments may be used. Each yoke section 3 is constructed of a plurality of fiber elements Fy of a single filament F, while the body section 2 is constructed of a plurality of fiber elements Fs, as shown and discussed with respect to FIGS. 2A–2C. Hoops 6 are formed on the outer surfaces of the body section 2 at its ends. A heat-shrinkable film (e.g., polyester film) is wound on the outermost surface of the body section 2. In place of the film, a heat-shrinkable tape or a heat-shrinkable fiber may be wound on the body section 2 in a layered form.

Figure 2B:
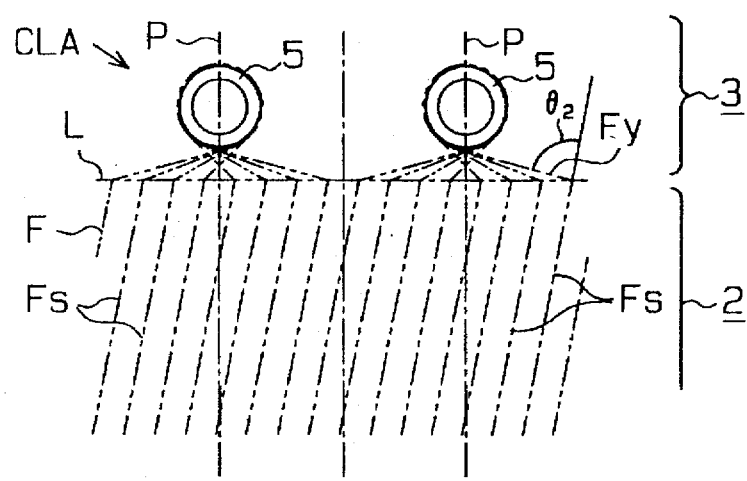
FIG. 2B is a partial schematic development view showing a filament layer in a closed loop arrangement.

In folding the filament F at the yoke sections 3, there are two types of arrangements for the individual fiber elements Fs and Fy in the individual filament layers. In one arrangement, after the fiber element Fy is folded at each yoke section 3, the fiber element Fy does not intersect a plane P containing the center of the hole 4 and the axis of the body section 2 above a line L as shown in FIG. 2A. This arrangement is called a U-shaped arrangement or an open loop arrangement (hereinafter abbreviated as "OLA"). In the other arrangement, after the filament F is folded at each yoke section 3, the filament F intersects the plane P above the line L as shown in FIG. 2B. This arrangement is called an X loop arrangement or a closed loop arrangement (hereinafter abbreviated as "CLA").

Figure 2C:
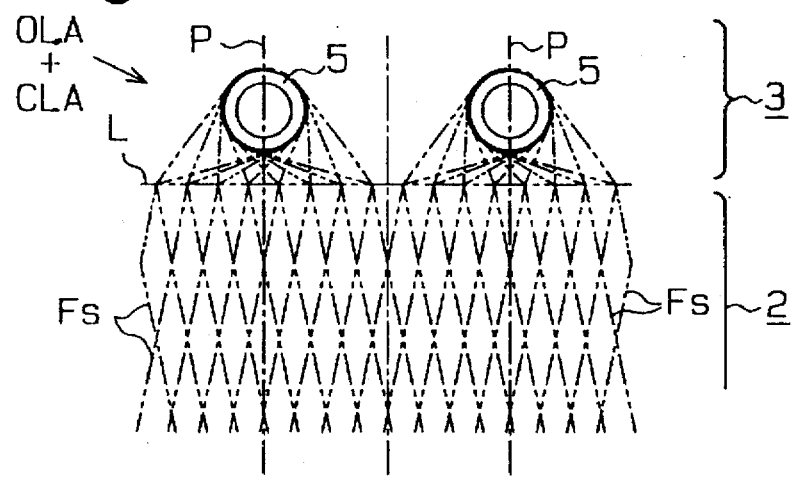
FIG. 2C is a partial schematic development view showing the open and closed loop arrangements overlapping each other.

FIGS. 2A through 2C are schematic development views showing the arrangements of the filament F on nearly the left half of the propeller shaft 1 as viewed in FIG. 1B. FIG. 2A shows the OLA, FIG. 2B shows the CLA, and FIG. 2C shows both the OLA and CLA overlapping each other. The actual number of fiber elements arranged is considerably larger than the illustrated one, but the fiber elements are partially omitted in the illustrations for convenience. In the diagrams, the portion above the line L corresponds to the yoke section 3 and the portion below the line L corresponds to the body section 2. (Similar illustrations will be given for the other embodiments.) The plane P is perpendicular to each drawing sheet. In each diagram, the left-hand side of a line C shows the propeller shaft 1 developed over a half circumference, and the right-hand side of the line C shows the propeller shaft 1 developed over the remaining half circumference.

The fiber elements Fs forming the same layer in the body section 2 are arranged obliquely at predetermined pitches so that the angles $\theta_1$ between the fiber elements Fs and the axis of the body section 2 are nearly equal to one another. The angle $\theta_1$ is set to a predetermined value which satisfies the characteristics such as bending, torsion, and vibration, which are required for a particular application. In this embodiment, the angle $\theta_1$ is set to around ±10 degrees. In other words, assuming that the fiber elements Fs in the filament layer having the OLA shown in FIG. 2A and the CLA shown in FIG. 2B have the angle $\theta_1$ of +10 degrees, then there are fiber elements Fs which have an angle of −10 degrees. Therefore, when filament layers having different arrangement angles are sequentially overlapped, the arrangement shown in FIG. 2C can be attained.

A carbon fiber, glass fiber, aramid fiber and the like may be used as the filament F used in the FRP. A thermosetting resin, such as an epoxy resin, vinyl ester resin, unsaturated polyester resin or phenol resin, may be used as the matrix in the FRP. Those fibers and resins are properly combined to satisfy the demanded characteristics. Of the mentioned fibers, the carbon fiber is the best choice in view of the strength and weight reduction, and the glass fiber is the second best choice. As the matrix, the epoxy resin is the best choice with respect to heat resistance and moisture resistance. In this embodiment, the combination of the carbon fiber and epoxy resin is employed.

A spider joint is rotatably attached via a bearing to the bushing 5 of each yoke section 3. Since the body section 2 and the yoke sections 3 are formed integrally, the propeller shaft 2 and the yoke sections 3 deform in nearly the same way when the propeller shaft 1 expands or shrinks in accordance with a change in temperature. Unlike the prior art shaft where the body section 2 and the yoke sections 3 are made of different materials, the fatigue properties of the present propeller shaft 1 are improved thus extending its service life. Further, the propeller shaft 1 can be made lighter than the conventional FRP propeller shaft.

The general shape of the yoke section 3 is determined by the filament layer in the OLA shown in FIG. 2A. It has been proven that the mechanical strengths, such as torsional strength and torsional rigidity, demanded for the propeller shaft 1 are satisfied even where the propeller shaft 1 is constructed of only the filament layers in the OLA. With the use of only the filament layers in the OLA, however, there remains a gap 7 between the bushing 5 and the body section 2 which has an undesirable shape. The filament layers in the CLA are arranged to close the gap 7 as shown in FIG. 2B.

The filament layers in the CLA contribute to the torsional strength more than the filament layers in the OLA. If the number of the filament layers in the CLA increases too much, the space between the bushing 5 and the body section 2 expands outward deteriorating the appearance. By combining the filament layers in the OLA and filament layers in the CLA, the propeller shaft 1, which is satisfactory in shape and material, can be obtained. The number of the filament layers constituting the body section 2, which is normally about four to twenty, is determined by the productivity and material requirements.

Figure 4:
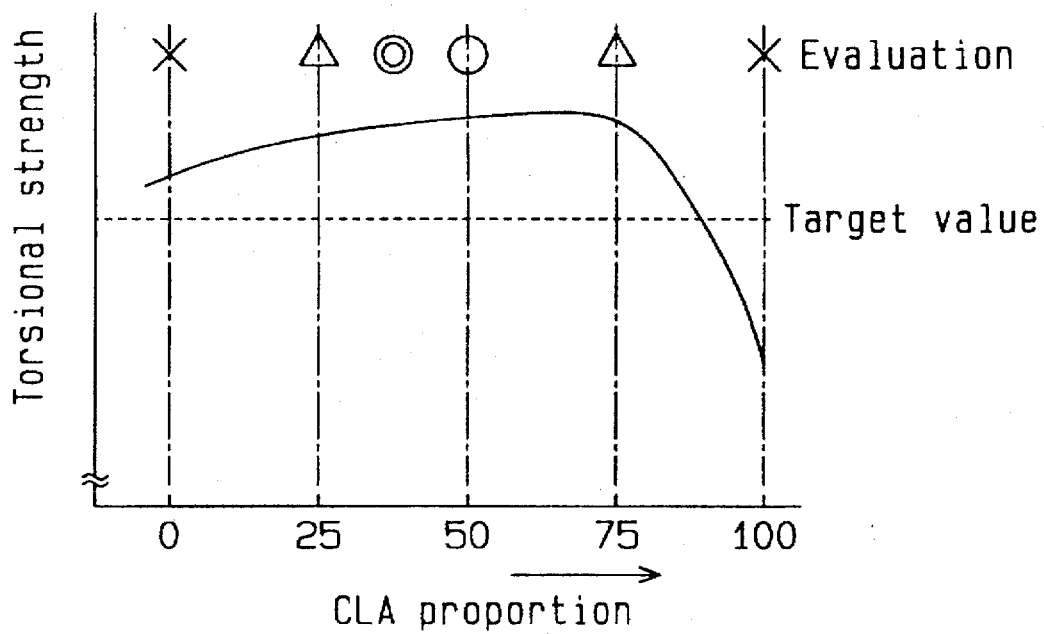
FIG. 4 is a graph showing the relation between the ratio of the closed loop arrangement to the open loop arrangement and the torsional strength of the propeller shaft.

The torsional strength, the torsional rigidity, and the shape of the propeller shaft 1 were evaluated while changing the proportion of the filament layers in the OLA to the filament layers in the CLA. The torsional strength was evaluated for the CLA proportion of 0%, 25%, 50%, 75% and 100%, and the torsional rigidity was evaluated only for those CLA proportions for which the torsional strength reached the target value. The shape evaluation was conducted also for CLA proportions other than those mentioned above. The results are shown in FIG. 4. In FIG. 4, the four evaluation marks indicate the following.

X: defect

Δ: normal o: good

⊚: excellent

The torsional strength exceeded the target value in every case except for the case where the CLA proportion is 100%. The torsional strength tended to increase with an increase in the CLA proportion until the CLA proportion became 75%. Accordingly, the combination of the OLA proportion of 20 to 100% and the CLA proportion of 80 to 0% is preferable. The combination of the OLA proportion of 55 to 70% and the CLA proportion of 45 to 30% is more preferable, and the combination of the OLA proportion of 60 to 65% and the CLA proportion of 40 to 35% is the most preferable. In any case, the total of the OLA proportion and CLA proportion comes to 100%.

Figure 3:
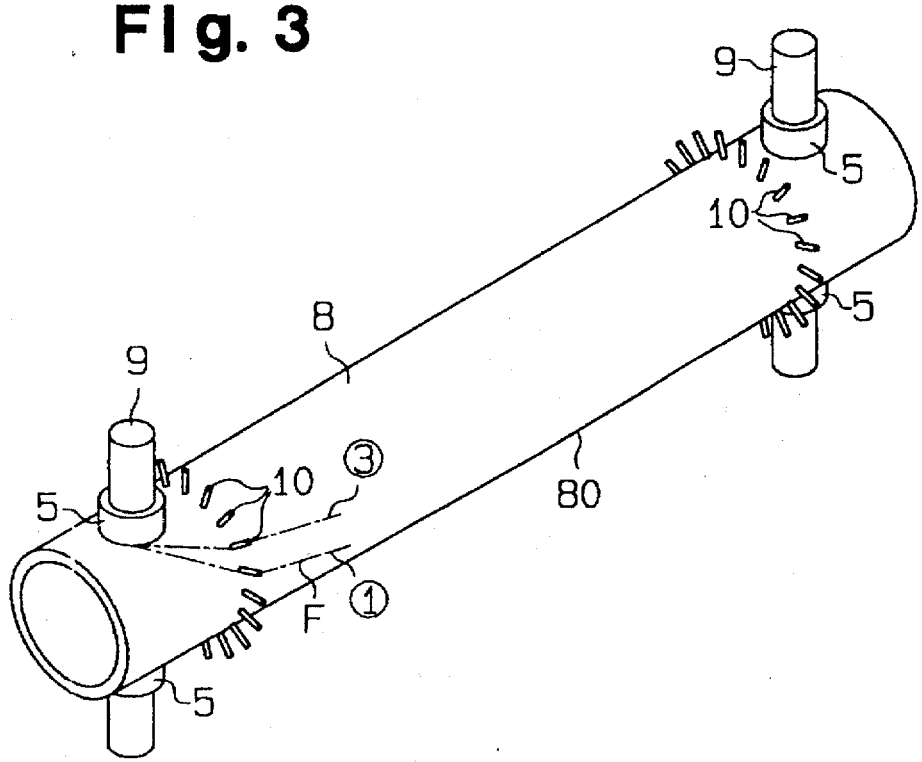
FIG. 3 is a schematic perspective view showing a mandrel used in manufacturing a propeller shaft.

A method of manufacturing the propeller shaft 1 will now be described. The propeller shaft 1 is produced by a filament winding method. As shown in FIG. 3, a mandrel 8 has a cylindrical metal body 80 with support pins 9 detachably inserted in both ends. The support pins 9 serve to form the holes 4 of the associated yoke sections 3 of the propeller shaft 1. Multiple protruding pins 10 are radially arranged in a detachable manner on the mandrel body 80 at predetermined intervals in the circumferential direction at positions corresponding to the boundaries between the body section 2 and the yoke sections 3.

The bushing 5 is fitted over each support pin 9 of the mandrel 8, and a bushing cover (not shown) is attached to the outer surface of the bushing 5. At this time, a clearance is formed between the end face of the cover and the mandrel 8. Then, the mandrel 8 is set to a filament winding machine (not shown) which can undergo multi-axis control. The filament winding machine should control the mandrel 8 in at least the rotational direction and the axial direction. However, a preferable filament winding machine is of a three-axes control type which can control the mandrel 8 in a direction perpendicular to the axial direction in addition to the rotational and axial directions.

Next, the filament winding machine is activated to control the rotation of the mandrel 8 and the movement of the thread guide section of the winding machine, so that the filament F is wound on the mandrel 8 while being impregnated with a thermosetting resin. In winding the filament F, first, the filament F is wound on the mandrel body 80 corresponding to the body section 2 at a predetermined angle. Then, the filament F is folded back along the circumferential direction of the bushing 5 to change the direction of the arrangement. The filament wound around the bushing 5 is located between the mandrel 8 and the bushing cover.

The filament F is wound on the body 80 such that a predetermined proportion of the OLA to the CLA is obtained at each yoke section 3 thus forming a plurality of filament layers. After the number of filament layers reaches a predetermined value, hooping is carried out inward of each ring of the pins 10 at both ends of the body 80 to complete the winding of the filament F.

Next, the pins 10 are detached from the body 80 and a heat-shrinkable film, such as a polyester film, is wound on the outer surfaces of the cylindrical filament layers on the mandrel 8. Then, the mandrel 8 with the filament layers and the film is placed in a curing oven to be cured at a predetermined temperature. The curing temperature, which differs depending on the resin in use, is, for example, about 180° C. for an epoxy resin. Finally, the bushing cover and the support pins 9 are removed from the body 80. Then, the body 80 is pulled out of the filament layers to complete the propeller shaft 1.

The hoops at both ends of the body section 2 prevent the disturbance of the filament arrangements at the end portions of the body section 2 until the thermosetting of the resin is completed after the removal of the pins 10. The heat-shrinkable film, like the hoops, prevents the disturbance of the filament arrangements and improves the appearance of the propeller shaft 1. The heat-shrinkable film also improves the shock resistance of the propeller shaft 1 when it is in use. If a small stone or the like hits the propeller shaft 1 while the vehicle is running, for example, the propeller shaft 1 can endure the impact due to the heat-shrinkable film wound around its outer surface.

A description will now be given of an example of procedures for forming one filament layer of the body section 2 in the OLA. A first arrangement layer A1 shown on the left-hand side in FIG. 2A is produced to form one of the pair of support pieces 3a of the yoke section 3 shown on the left-hand side in FIG. 1A. A second arrangement layer A2 shown on the right-hand side in FIG. 2A is produced to form the other support piece.

The formation of the first arrangement layer A1 will be explained in accordance with numerals (1), (2) and (3) in FIG. 2A. The filament F is wound on the body 80 of the mandrel 8 along the leftmost line (1) of the first arrangement layer A1.

Next, the filament F is engaged with one pin 10 (not shown in FIG. 2A; see FIG. 3), changing its arrangement direction, and is folded back around the bushing 5. At this time, the filament F is folded back in symmetry to the plane P. Then, the filament F is engaged with another pin 10, again changing its arrangement direction, and is laid out along the rightmost line (2) of the first arrangement layer A1.

Thereafter, the filament F is folded back at the yoke section 3 at the opposite end of the shaft (on the right-hand side in FIG. 1A). Then, the filament F is laid out along the line (3) which is located one pitch inward of the line (1).

Thereafter, the fiber element is sequentially shifted inward by one pitch in the same manner, thus forming the first arrangement layer A1. After the formation of the first arrangement layer A1, the second arrangement layer A2 is formed inward line by line in the same way as the first arrangement layer A1. The angles $\theta_1$ at which the individual fiber elements Fs constituting a single layer on the body section 2 intersect the axis of the body section 2 are nearly the same.

Subsequent layers are formed in substantially the same manner as described for the above case. In subsequent layers, the angle $\theta_1$ may be opposite to that of the previous layer and the arrangement may be OLA or CLA. In folding the filament F back at the yoke section 3, the fiber portion leading into and the fiber portion leading away from the fold need not always be symmetrical to the plane P. In the case where the portion of the fiber Fy leading into the fold is located outermost on the left-hand side of the yoke section 3 as shown in FIG. 2A, for example, the portion leading away from the fold may be located innermost (near the plane P) on the right-hand side of the yoke section 3. In this case, though not illustrated, the portion leading into the fold is gradually shifted inward on the left-hand side of the yoke section 3 while the folded end (leading away) of the fiber element Fy is gradually shifted outward on the right-hand side of the yoke section 3.

Second Embodiment

Figure 5A:
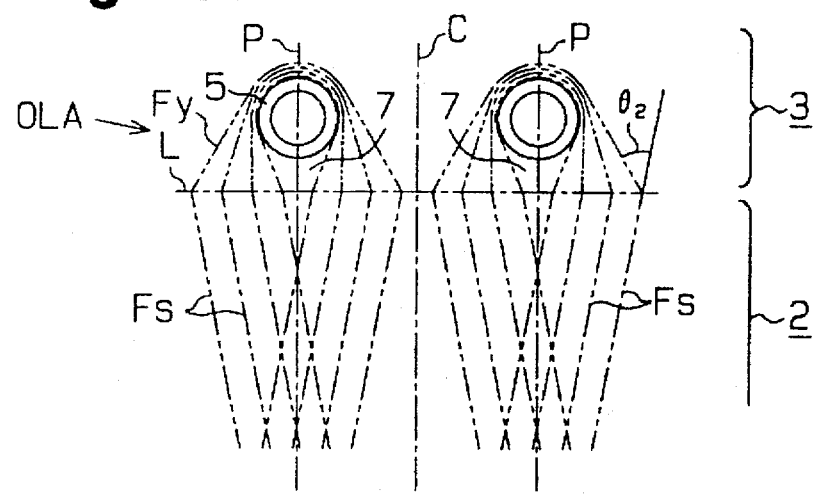
FIGS. 5A, 5B and 5C are partial schematic development views similar to those of FIGS. 2A, 2B and 2C and illustrate a second embodiment.

A second embodiment will be described below with reference to FIG. 5. This embodiment differs from the first embodiment in the arrangement of the fiber element Fs on the body section 2 of the propeller shaft 1. The other structures are the same as those of the first embodiment. In the second embodiment, half of the fiber elements Fs constituting the same layer on the body section 2 are inclined symmetrically to the remaining half with respect to the plane P.

For a fiber reinforced composite material, generally speaking, the fiber reinforcing effect becomes small at a place where the filaments constituting the composite material are more sharply bent. When the angles $\theta_1$ between the individual fiber elements Fs constituting the same layer on the body section 2 and the axis of the body section 2 are the same as in the first embodiment, the angle $\theta_2$ between the fiber element Fs and the fiber element Fy in the CLA is relatively large. In other words, the angle $\theta_2$ between the fiber element Fs and the fiber element Fy, both located on the right-hand side of the plane P in FIG. 2B, is relatively large and the reinforcing effect by the filaments near the interface portion between the yoke section 3 and the body section 2 is relatively weaker because a large angle $\theta_2$ corresponds to a sharper bend by the fibers at the interface between the body and the yoke.

Figure 5B:
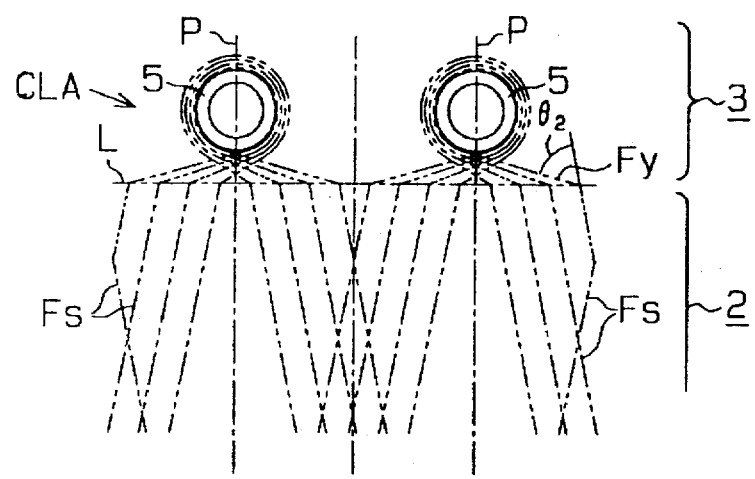
Figure 5C:
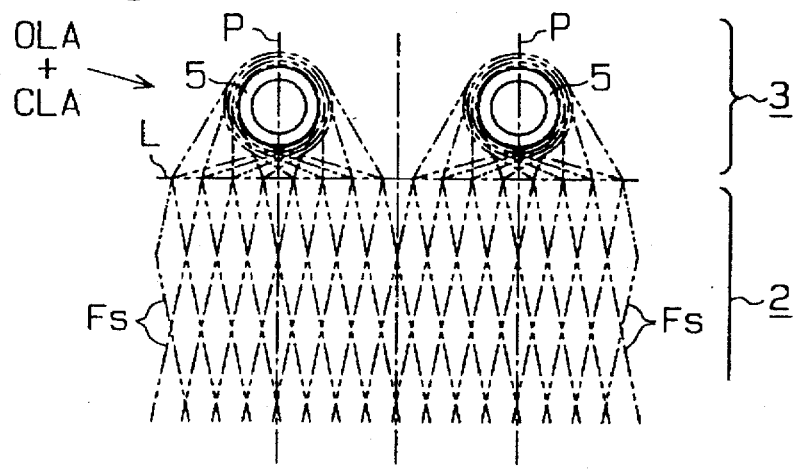

In contrast to the first embodiment, the angle of bend $\theta_2$ between the fiber element Fs and the fiber element Fy in the CLA shown in FIG. 5B is smaller than the angle of bend $\theta_2$ shown in FIG. 2B. Therefore, the reinforcing effect by the filaments near the interface portion between the yoke section 3 and the body section 2 is stronger as compared with the propeller shaft 1 of the first embodiment. The other function and advantages of the second embodiment are the same as those of the propeller shaft 1 of the first embodiment. The propeller shaft 1 is manufactured using the same mandrel 8 and process as used in the first embodiment.

Third Embodiment

Figure 6A:
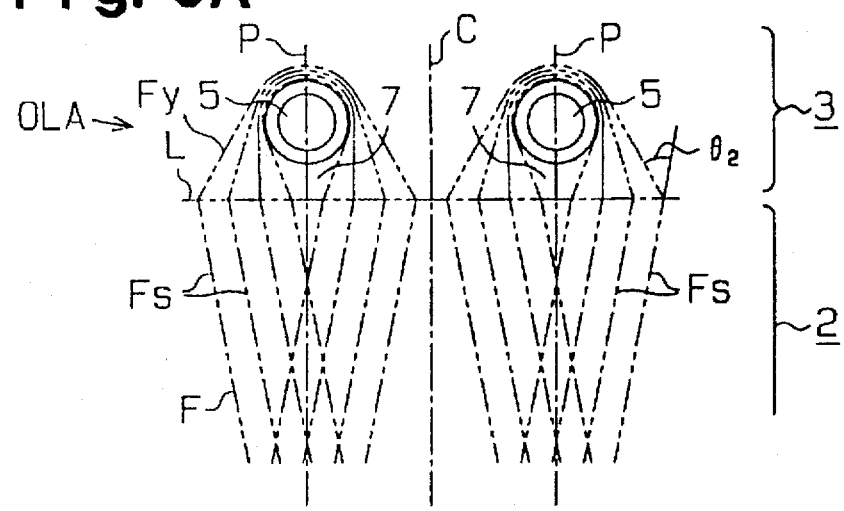
FIGS. 6A, 6B and 6C are partial schematic development views similar to those of FIGS. 2A, 2B and 2C and illustrate a third embodiment.
Figure 6B:
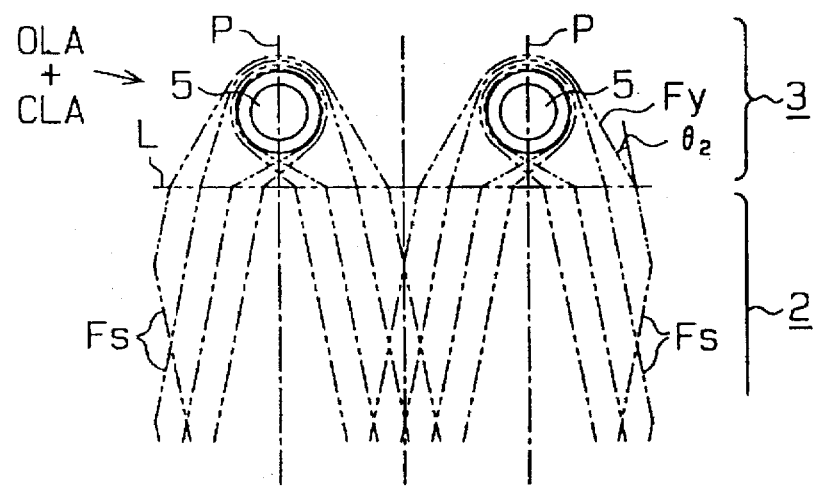
Figure 6C:
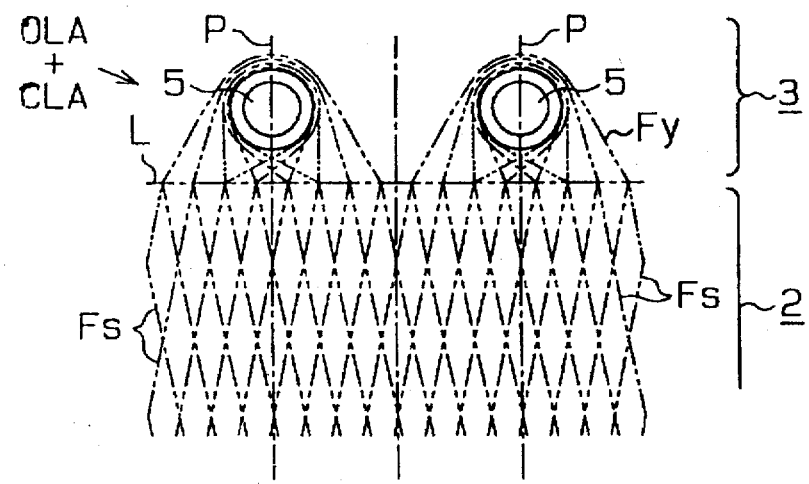

A third embodiment will now be discussed with reference to FIG. 6. The propeller shaft 1 of this embodiment is essentially the propeller shaft 1 of the second embodiment where the arrangement of the filament F is partly changed. In the third embodiment, while the arrangement of the fiber element Fs on the body section 2 is the same as that of the second embodiment, a part of the arrangement of the fiber element Fy at the yoke section 3 is different from that of the second embodiment.

In the second embodiment, as shown in FIGS. 5A and 5B, the fiber elements Fs constituting the same layer on the body section 2 are continuous with fiber elements Fy forming only an OLA or forming only a CLA at the yoke section 3. In the third embodiment, however, some fiber elements Fs constituting the same layer on the body section 2 are continuous with fiber elements Fy arranged in both an OLA and a CLA. More specifically, the outer fiber element Fs in a given filament layer, whose angle of bend $\theta_2$ becomes relatively large when the CLA is used, is continuous with the fiber element Fy whose arrangement is changed to an OLA as shown in FIG. 6B. As a result, the maximum angle of bend $\theta_2$ for the whole layer is reduced.

As compared with the propeller shaft 1 of the second embodiment, therefore, the reinforcing effect by the filaments near the interface portion between the yoke section 3 and the body section 2 is further improved. The other function and advantages and the method of the third embodiment are the same as those of the second embodiment.

Fourth Embodiment

Figure 7A:
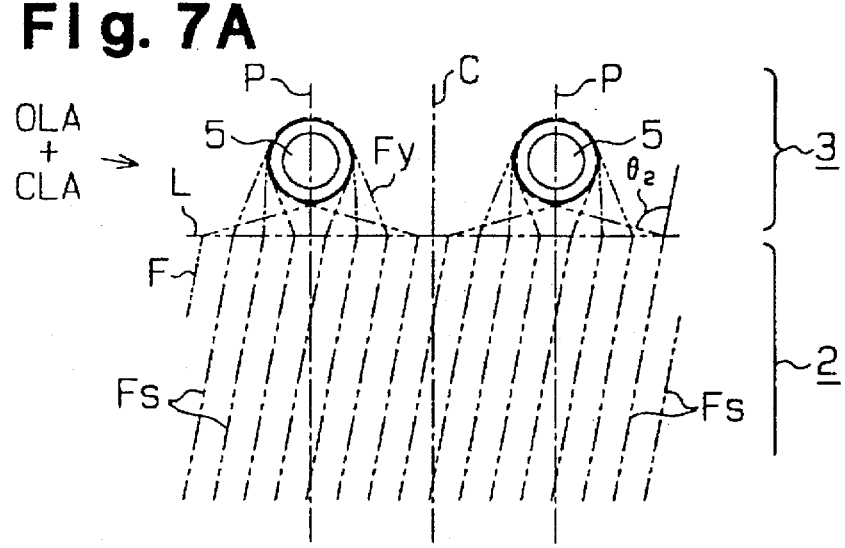
FIGS. 7A, 7B and 7C are partial schematic development views similar to those of FIGS. 2A, 2B and 2C and illustrate a fourth embodiment.
Figure 7B:
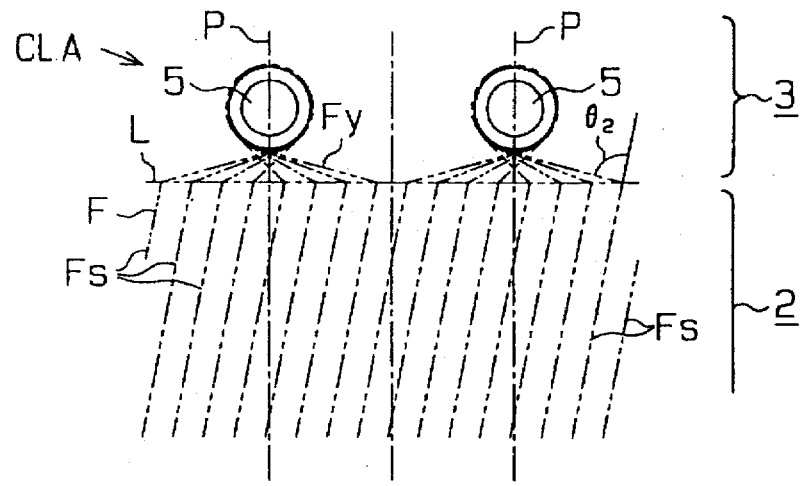
Figure 7C:
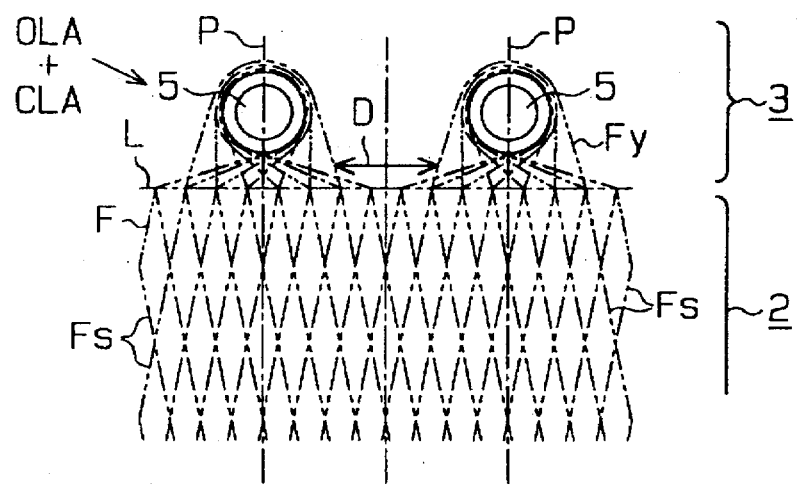

A fourth embodiment will now be discussed with reference to FIG. 7. The propeller shaft 1 of this embodiment is essentially the propeller shaft 1 of the first embodiment where the arrangement of the fiber element is partly changed. In the fourth embodiment, while the arrangement of the fiber element Fs on the body section 2 is the same as that of the first embodiment, the arrangement of the fiber element Fy at the yoke section 3 partly differs.

In the first embodiment, the fiber elements Fs constituting the same layer on the body section 2 are continuous with fiber elements Fy forming only an OLA or only a CLA at the yoke section 3. In the fourth embodiment, however, the fiber elements Fs constituting the same layer on the body section 2 are continuous with fiber elements Fy arranged in both an OLA and a CLA as shown in FIG. 7A. More specifically, the arrangement of outermost fiber element Fy at the yoke section 3 in the first embodiment when the OLA is used, is changed to the CLA as shown in FIG. 7A.

Therefore, the yoke section 3 of the propeller shaft 1 of this embodiment becomes narrower than those in the above-described embodiments. Accordingly, the distance D (FIG. 7C) between the support pieces 3a constituting the yoke section 3 becomes wider. This reduces the possibility of interference of the yoke sections with the mating yokes of a vehicle when the propeller shaft 1 is installed. The other function and advantages and the method are almost the same as those of the first embodiment.

Fifth Embodiment

A fifth embodiment will now be discussed with reference to FIG. 8. The fiber elements Fs on the body section 2 in this embodiment have straight sections Fss. The fifth embodiment differs significantly from the first embodiment in that there are a plurality of bending points (two in this embodiment) Pb between the fiber element Fs on the body section 2, which has the angle $\theta_1$, and the fiber element Fy at the yoke section 3. Therefore, the angle of arrangement $\theta_1$ of each fiber element at the end of the body section 2 differs from that of the same fiber element at the intermediate portion of the body section 2.

Figure 8A:
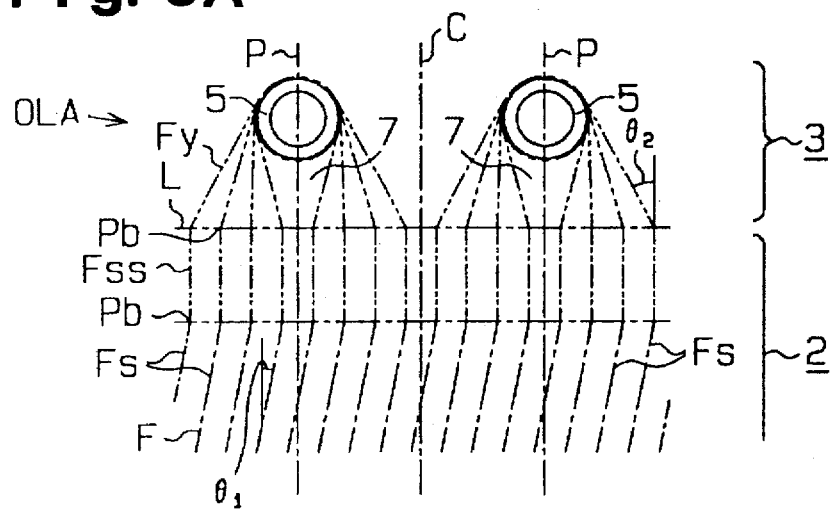
FIGS. 8A, 8B and 8C are partial schematic development views similar to those of FIGS. 2A, 2B and 2C and illustrate a fifth embodiment.
Figure 8B:
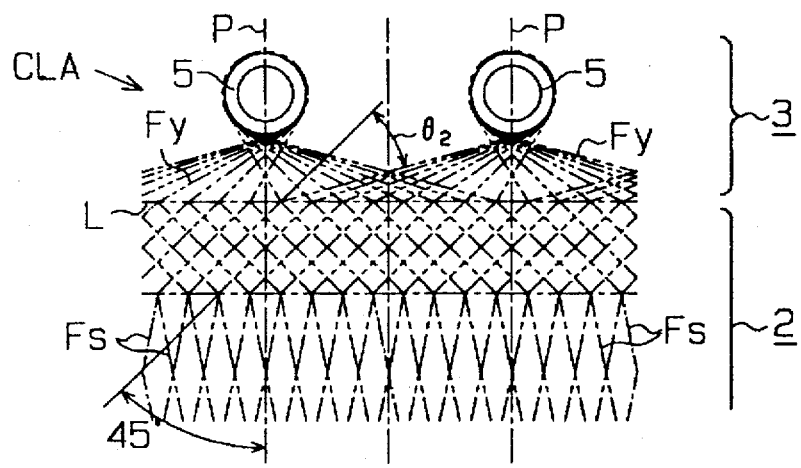
Figure 8C:
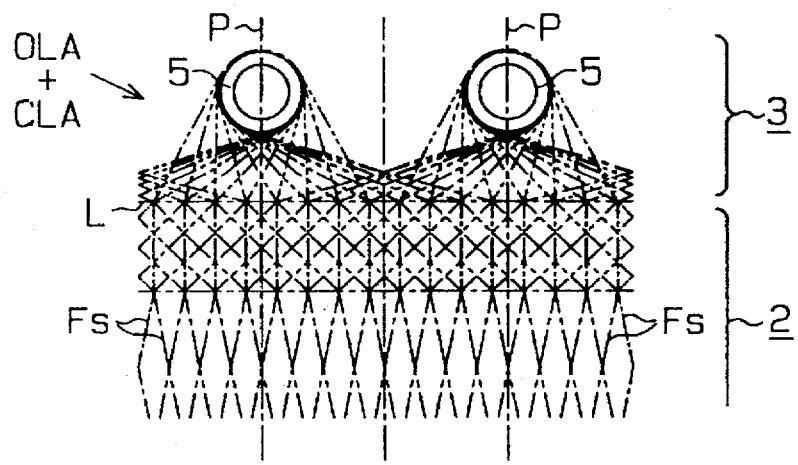

As shown in FIG. 8A, the straight sections Fss of each fiber element Fs in the OLA are arranged in parallel to the axis of the body section 2 at the end portion thereof. As shown in FIG. 8B, the individual fiber elements Fs in the CLA are arranged at angles of almost ±45 degrees with respect to the axis of the body section 2 at the end portion thereof. Those fiber elements Fy in the CLA which are located on opposite sides of the plane P at the folding portion, are inclined on the body section 2 in symmetry to the plane P. Further, only those fiber elements Fy in the CLA which are located on the left-hand side of the plane P at the folding portion of the yoke section 3, are arranged to be continuous with one layer of the fiber elements Fs on the body section 2. Therefore, the fiber elements Fy on both sides of the plane P are continuous with two layers of the fiber elements Fs on the body section 2.

In this embodiment, the fiber elements Fs at the end portion of the body section 2 are continuous with the fiber elements Fy at the yoke section 3 after its angle of arrangement is changed once so that the maximum value of the angle of bend $\theta_2$ between the fiber elements Fs and the fiber elements Fy is smaller than that of the first embodiment. Further, the arrangement of the filament F becomes easier. The propeller shaft 1 of the fifth embodiment is manufactured by the filament winding method using the mandrel 8 which has two lines of pins 10 in association with each end portion of the body section 2. When the filament F is wound on the mandrel 8, it engages the individual pins 10 to change the arrangement direction or the angle of arrangement.

Sixth Embodiment

Figure 9A:
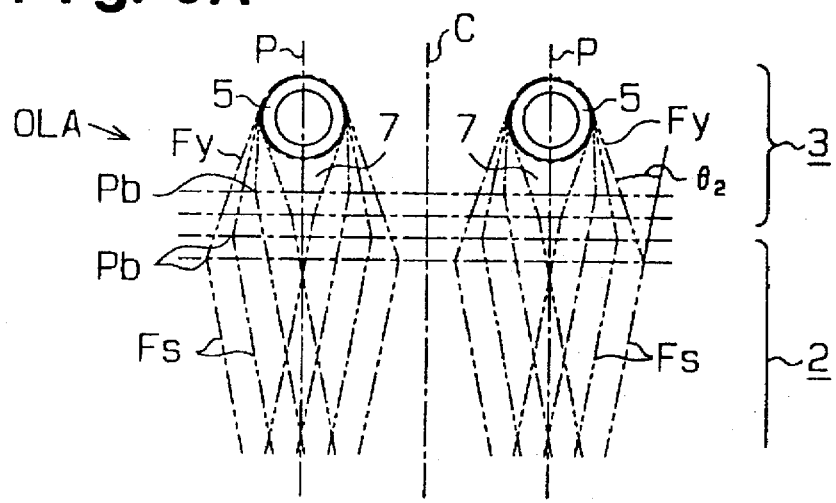
FIGS. 9A, 9B and 9C are partial schematic development views similar to those of FIGS. 2A, 2B and 2C and illustrate a sixth embodiment.
Figure 9B:
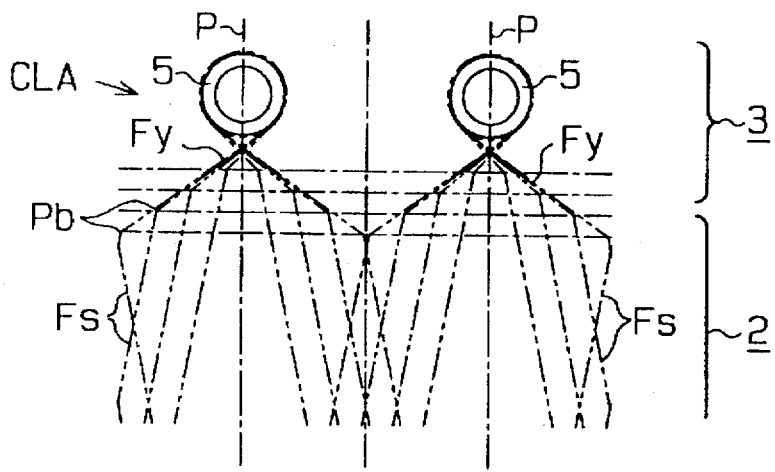
Figure 9C:
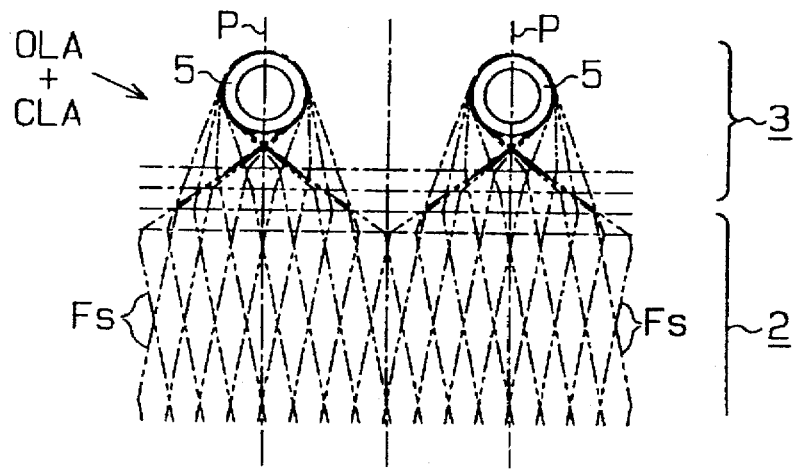

A sixth embodiment will now be discussed with reference to FIG. 9. The sixth embodiment differs significantly from the above-described embodiments in that the positions of the bending points Pb between the fiber element Fy at the yoke section 3 and the fiber element Fs on the body section 2 in the same layer are shifted in the axial direction of the body section 2. The remaining structure is fundamentally the same as that of the second embodiment. As shown in FIGS. 9A and 9B, the bending points Pb of the filament F in the OLA and CLA are located on the boundary between the yoke section 3 and the body section 2 or are located on the yoke section (3) side with respect to the boundary.

The maximum value of the angle of bend $\theta_2$ of the filament F in the sixth embodiment is also smaller than that of the first embodiment so that this embodiment exhibits the same function and advantages as the second embodiment. As the bending points Pb of the filament F of the propeller shaft 1 according to this embodiment are dispersed, the strengths of the yoke section 3 and the area near the interface portion between the yoke section 3 and the body section 2 are improved. The propeller shaft 1 of this embodiment is manufactured by the filament winding method using the mandrel 8 which has plural lines of pins 10 in association with each end portion of the body section 2. When the filament F is wound on the mandrel 8, the filament F engages the individual pins 10 to change the arrangement direction or the angle of arrangement.

Seventh Embodiment

Figure 10A:
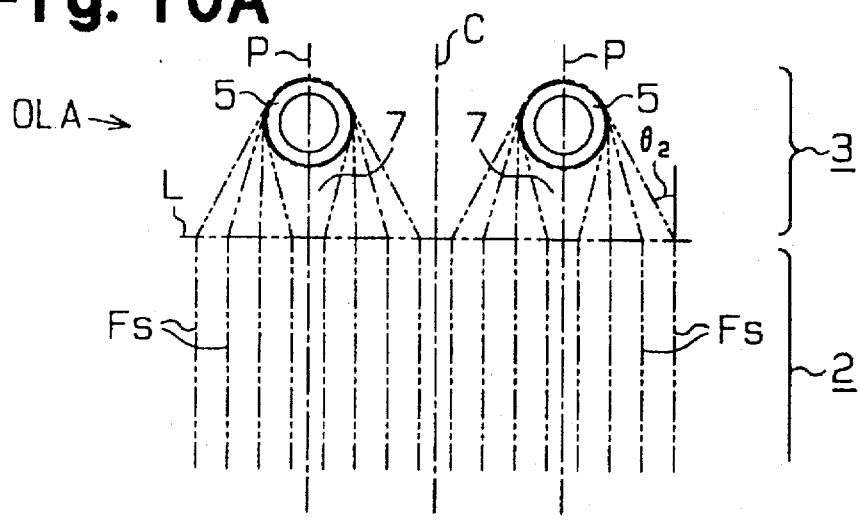
FIGS. 10A, 10B and 10C are partial schematic development views similar to those of FIGS. 2A, 2B and 2C and illustrate a seventh embodiment.
Figure 10B:
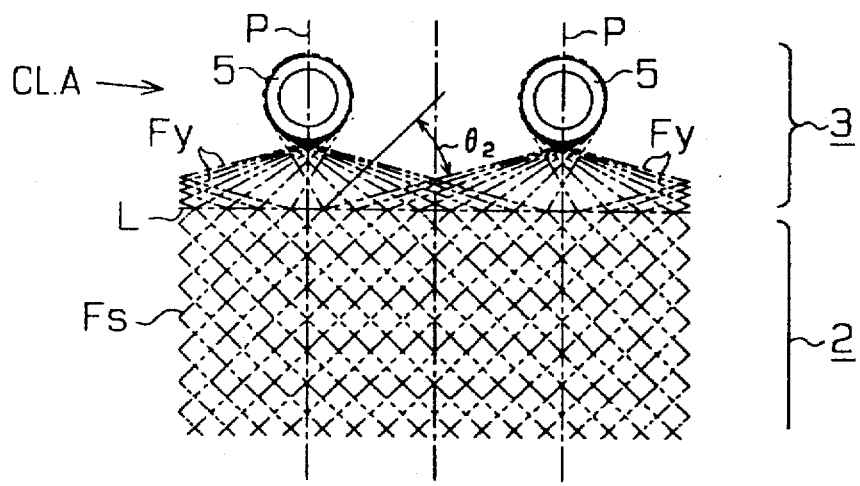
Figure 10C:
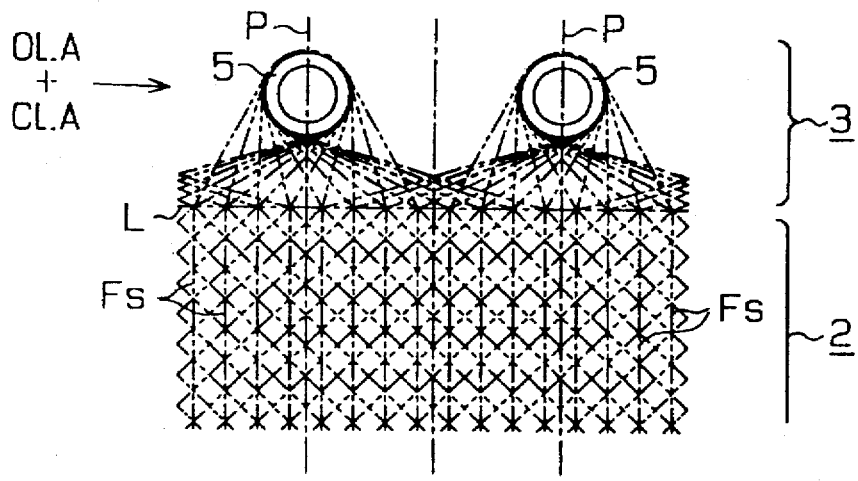

A seventh embodiment will now be discussed with reference to FIG. 10. As shown in FIG. 10A, the fiber elements Fs in the OLA are arranged nearly parallel to the axis of the body section 2. As shown in FIG. 10B, the individual fiber elements Fs in the CLA are arranged at angles of almost ±45 degrees with respect to the axis of the body section 2. Further, only those fiber elements Fy in the CLA which are located on the left-hand side of the plane P at the folding portion of the yoke section 3 are arranged to be continuous with one layer of the fiber elements Fs on the body section 2 (as in the fifth embodiment). Therefore, the fiber elements Fy on both sides of the plane P are continuous with two layers of fiber elements Fs on the body section 2.

In other words, in this embodiment, the maximum value of the angle of bend $\theta_2$ between the fiber elements Fs and the fiber elements Fy is smaller than that of the propeller shaft 1 of each embodiment described earlier and the strength of the yoke section 3, particularly the strength to the torsional torque, is further improved. The improved torsional strength permits the body section 2 to be made narrower and thinner. The other function and advantages of this embodiment are the same as those of the first embodiment. The propeller shaft 1 of this embodiment is manufactured using the mandrel 8 of the first embodiment in almost the same manner as the first embodiment.

The angle at which the fiber elements Fs in the CLA intersect the axis of the body section 2 may be other than ±45 degrees. Propeller shafts were manufactured with this angle changed to ±60 degrees and ±75 degrees. The breakdown torsional strengths in both cases reached the target value. With the same proportion of the fiber elements Fs in the CLA, the breakdown torsional strength increased as the angle of the fiber element Fs became smaller as follows.

torque for ±75°<torque for ±60°<torque for ±45°

In each of the cases where the angle at which the fiber elements Fs in the CLA intersect the axis of the body section 2 was set to the aforementioned values, the propeller shaft 1 was manufactured with the proportion of the fiber elements Fs in the CLA changed and the torsional torque, torsional rigidity, and the critical number of rotations were evaluated. The best result was obtained when the proportion of the fiber elements Fs in the CLA was equal to or below approximately 40%.

Eighth Embodiment

Figure 11A:
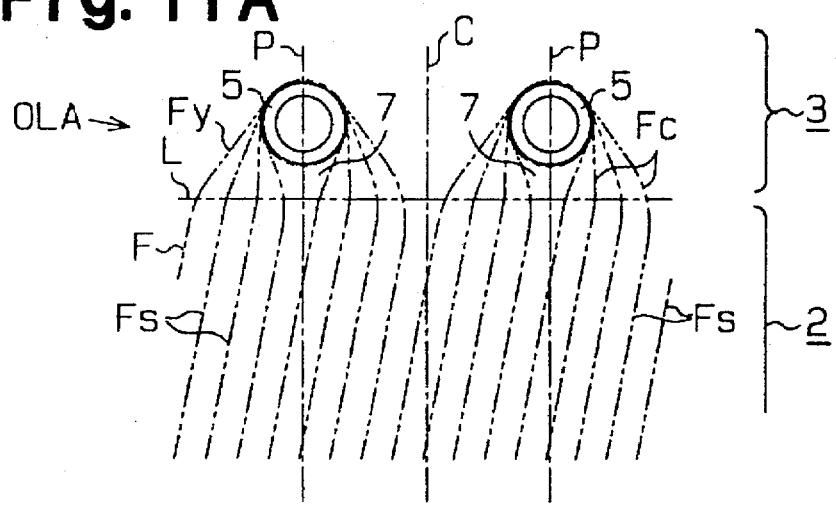
FIGS. 11A, 11b and 11C are partial schematic development views similar to those of FIGS. 2A, 2B and 2C and illustrate an eighth embodiment.
Figure 11B:
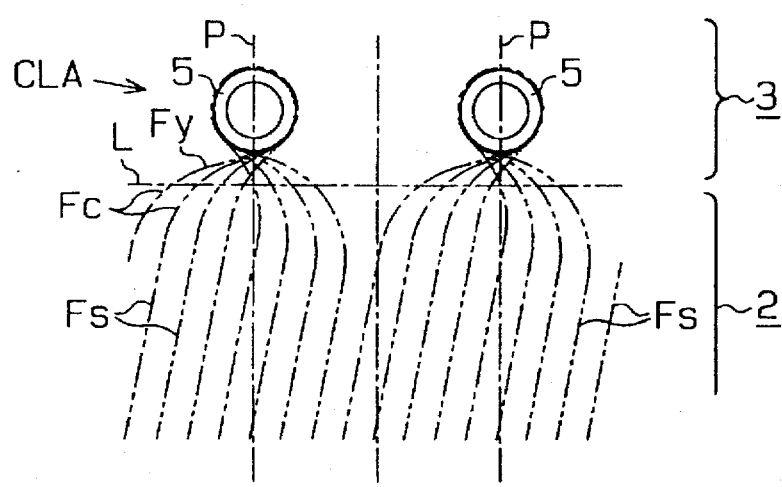
Figure 11C:
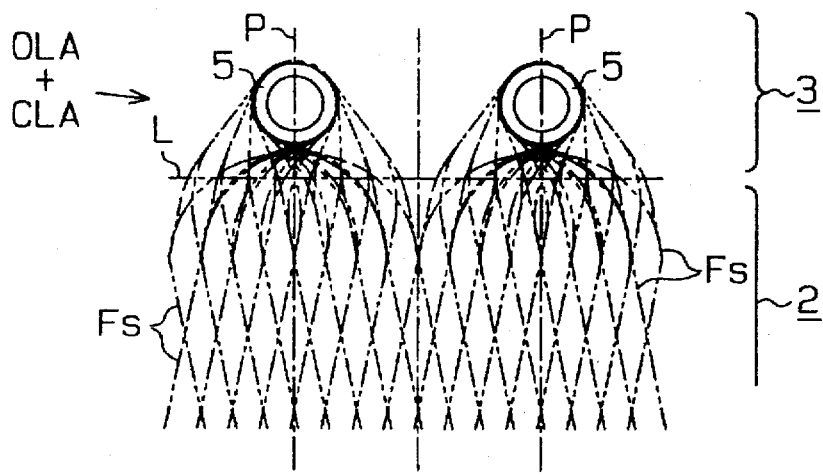

An eighth embodiment will now be discussed with reference to FIG. 11. The propeller shaft 1 of this embodiment is the propeller shaft 1 of the first embodiment in which the arrangement of the filament F is partly changed. More specifically, all the fiber elements in the OLA and CLA are arranged in such a way that the sections Fy arranged at the yoke section 3 are smoothly continuous with the sections Fs arranged on the body section 2 via curved sections Fc. Accordingly, there is no section of the filament F which bends sharply in the vicinity of the interface portion between the yoke section 3 and the body section 2 thus improving the filament's reinforcing effect. The other function and advantages of this embodiment are almost the same as those of the propeller shaft 1 according to the first embodiment.

The propeller shaft 1 of this embodiment is manufactured by the filament winding method using the mandrel 8 which has no protruding pins 10. In this case, as the pins 10 are unnecessary, it is possible to eliminate the troublesome installation of multiple pins 10 in the mandrel 8 before the arrangement of the filament F and the tiresome work of removing those pins 10 from the mandrel 8.

Ninth Embodiment

Figure 12:
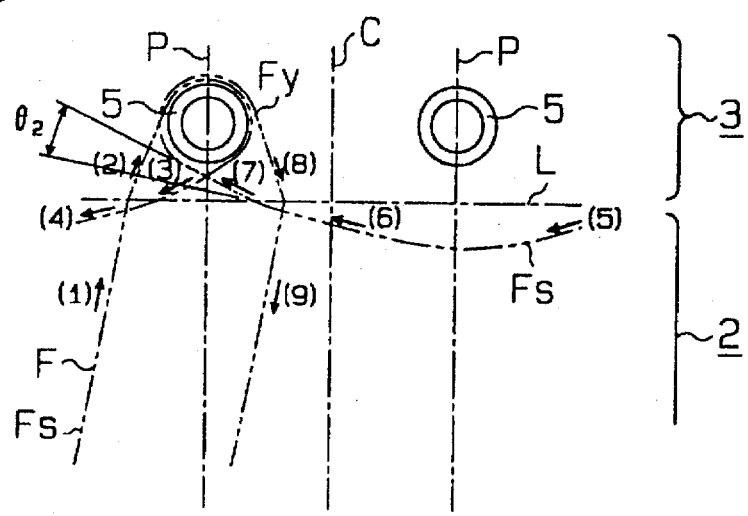
FIG. 12 is a partial schematic view showing a ninth embodiment.

A ninth embodiment will now be discussed with reference to FIG. 12. In this embodiment, those fiber elements Fs on the body section 2 which are continuous with the fiber elements Fy in the CLA at the yoke section 3 are arranged nearly in the circumferential direction at the end portion of the body section 2. That is, the angles of bend $\theta_2$ between the fiber elements Fy and the fiber elements Fs in the CLA all become smaller. This increases the reinforcing effect of the filament F in the vicinity of the interface portion between the yoke section 3 and the body section 2. In manufacturing the propeller shaft 1 of this embodiment, the filament F is arranged in, for example, the numbered order shown in FIG. 12, and the OLA and the CLA are alternately formed at the yoke section 3.

In the case where all the fiber elements in the CLA are arranged as in the ninth embodiment, since the end portion of the yoke section 3 which connects to the body section and the adjoining end portion of the body section 2 expand, it is preferable that a part of the CLA in each previously-discussed embodiment be replaced with the arrangement of this embodiment.

Tenth Embodiment

Figure 13A:
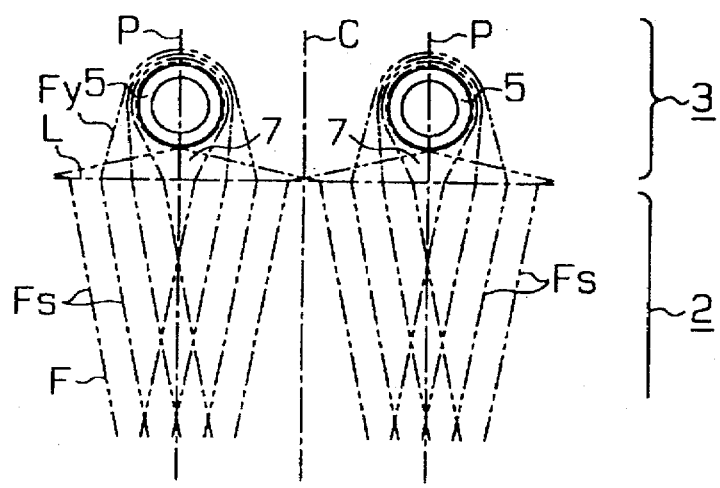
Figure 13B:
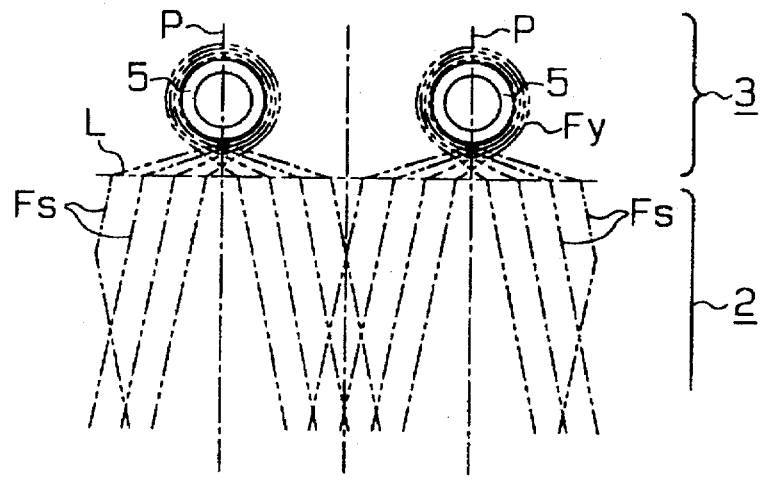

A tenth embodiment will now be discussed with reference to FIG. 13. While the arrangement of the filament F at the yoke section 3 of the propeller shaft 1 of this embodiment is the same as that of the fourth embodiment shown in FIG. 7, the arrangement of the filament F on the body section 2 differs from that in the fourth embodiment. More specifically, those fiber elements Fs which are located on opposite sides of the plane P and constitute the same layer are symmetrically inclined with respect to the plane P. Accordingly, the filament's reinforcing effect in the vicinity of the interface portion between the yoke section 3 and the body section 2 becomes greater than that of the propeller shaft 1 of the fourth embodiment. The other function and advantages of this embodiment are the same as those of the fourth embodiment.

Although only several embodiments of the present invention have been described herein, it should be apparent to those skilled in the art that the present invention may be embodied in many other specific forms, particularly in the following forms, without departing from the spirit or scope of the invention.

Figure 14:
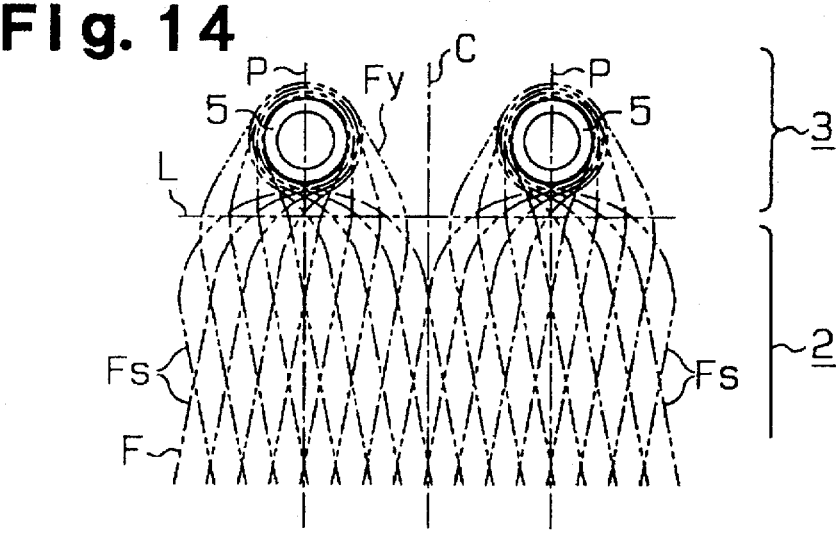
FIG. 14 is a partial schematic development view showing a modification.
Figure 15:
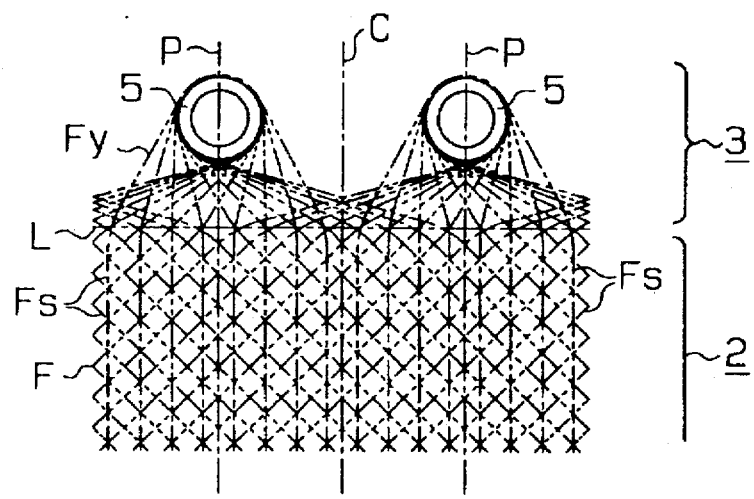
FIG. 15 is a partial schematic development view showing another modification.

(1) The end portion of the fiber element Fs on the body section 2 may be smoothly connected to the end portion of the fiber element Fy at the yoke section 3 via a curved section. If the propeller shaft is manufactured by employing the same basic arrangement of the filament F as used in the second embodiment and by the filament winding method using the mandrel 8 having no protruding pins 10, for instance, the arrangement as shown in FIG. 14 is attained. If the propeller shaft is manufactured by employing the same basic arrangement of the filament F as used in the seventh embodiment and by the filament winding method using the mandrel 8 having no protruding pins 10, the arrangement as shown in FIG. 15 is attained.

Figure 16:
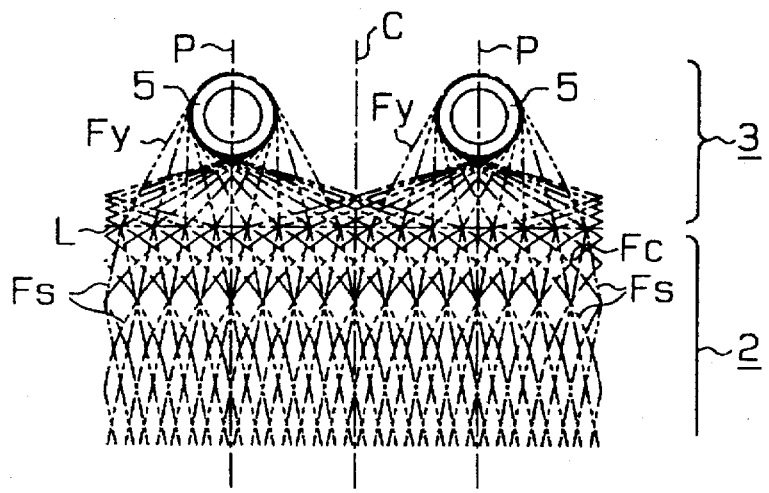
FIG. 16 is a partial schematic development view showing a further modification.

For the filament F having the same basic arrangement as employed in the third to sixth embodiments and the tenth embodiment, the end portion of the fiber element Fs on the body section 2 may be smoothly connected to the end portion of the fiber element Fy at the yoke section 3 via a curved section. Further, the propeller shaft may be manufactured by employing the same basic arrangement of the filament F as used in the fifth embodiment and by the filament winding method using the mandrel 8 in which the pins 10 are provided only at the interface portion between the yoke section 3 and the body section 2. In this case, the fiber elements Fy at the yoke section 3 are arranged straight, and the curved sections Fc are formed at the end portion of the body section 2, as shown in FIG. 16.

(2) In the above-described embodiments, the support pieces 3a of the yoke section 3 are curved in association with the outer shape of the mandrel 8. As shown in FIG. 17, however, both sides of each support piece 3a of the yoke section 3 may be formed flat. With the yoke section 3 having such a shape, it is easy to attach a snap ring or the like when the spider joint is coupled to the yoke section 3 via a bearing. In forming the support pieces 3a in that shape, a spacer having a flat outer surface is attached to the proximal end of the support pin 9 and the mandrel 8 with the bushing 5 and bushing cover attached outside the spacer is used to manufacture the propeller shaft 1.

(3) The bushing 5 is not essential, so that the bearing may be directly fitted in the hole 4 when the bushing 5 is not used. In this case, the propeller shaft 1 is manufactured using the mandrel which has support pins 9 whose outside diameter is equivalent to the outside diameter of the bearing. When the bushing 5 is used, a corrugation, such as a roulette, may be formed on the outer surface of the bushing 5 to improve the adhesive strength between the bushing 5 and the FRP for the purpose of preventing the rotation or the drive-off of the bushing 5. Further, the bushing 5 may have a polygonal outer shape with multiple grooves formed in the outer surface extending in the axial direction.

(4) As the combination of the filament and matrix resin which constitute the FRP, a carbon fiber and vinyl ester resin, a carbon fiber and phenol resin, or the like may be used instead of the carbon fiber and epoxy resin. In this case, the costs of the replacement resins are lower than the cost of the epoxy resin thus reducing the overall cost of the propeller shaft. Further, carbon fiber and glass fiber may be mixed, or carbon fiber and aramid fiber may be mixed. As the matrix resin, the thermosetting resin may be replaced with a thermoplastic resin, such as polyether ether ketone (PEEK) or nylon.

(5) The present invention may be adapted for other drive shafts than the propeller shaft 1 for a vehicle. When the rotational speed is slow or the required specifications such as torsional strength, heat resistance, and moisture resistance, are low, the glass fiber or aramid fiber may be used alone as the reinforced fiber or a resin other than epoxy resin may be used as the matrix resin. In other words, the epoxy resin (EP), vinyl ester resin (VE), unsaturated polyester resin (UP) and phenol resin as the matrix, and the carbon fiber (CF), glass fiber (GF), and aramid fiber (AF) as the reinforced fiber may be properly combined in accordance with the demanded performances. The combinations include CF-VE, CF-UP, CF-phenol resin, GF-EP, GF-VE, GF-UP, AF-EP, AF-VE, AF-UP, and AF-phenol resin.

When high heat resistance and high moisture resistance are not required, it is preferable to use a resin other than epoxy resin. When the required torsional strength is low, it is preferable to use the glass fiber or aramid fiber. The carbon fiber may be mixed with the glass fiber or aramid fiber. Those combinations result in a lower manufacturing cost than the combination of the carbon fiber and epoxy resin. Further, the body section 2 may be formed in a polygonal prism rather than a cylinder.

(6) In the seventh embodiment, the filaments Fs parallel to the axis of the body section 2 shown in FIG. 10A may be replaced with fiber elements Fs which are slightly inclined with respect to the axis of the body section 2.

(7) At the time the filament is arranged, not all the fiber elements Fs should be folded back around the hole 4 or the bushing 5 to constitute the fiber elements Fy. The fiber elements Fs may be partly folded at the end portion of the body section 2 before reaching the bushing 5. The mandrel 8 may have the shape of a circular column or may be designed to be separable into a plurality of parts.

(8) The hoops 6 provided at the end portions of the body section 2 may be properly be formed between the filament layers. Especially where the propeller shaft 1 is manufactured using the mandrel 8 having no protruding pins 10, the provision of the hoops 6 between the filament layers contributes to the stabilization of the filament arrangement at the end portions of the body section 2.

(9) As shown in FIG. 18, both ends of the open loop of the fiber element Fy may be arranged eccentrically outside the body section 2.

Therefore, the present examples and embodiments are to be considered as illustrative and not restrictive and the invention is not to be limited to the details given herein, but may be modified within the scope of the appended claims.

What is claimed is:

1. A shaft having a longitudinal body section having a longitudinal axis and a yoke section formed with at least one end of the body section, said yoke section having a hole, and said body section and said yoke section being integrally made of a fiber reinforced composite material including a filament and a plastic adhered to the filament, said shaft comprising:

a plurality of yoke fiber layers forming a yoke section, each yoke fiber layer including a plurality of yoke fiber elements looped around the hole and having a first portion and a second portion depending from the hole, each portion having an end, a plurality of shaft fiber layers forming said body section, each shaft fiber layer including a plurality of shaft fiber elements each having a connecting portion connected to one of said ends of said first and second portions, said connecting portion being bent away from either of said first and second portions at an angle of less than 180°, such that said shaft fiber elements extend along said body section at a predetermined angle with respect to the longitudinal axis of said body section, said shaft fiber elements being equi-spaced circumferentially about said body section; and wherein each yoke fiber element has at least one of a closed loop arrangement and an open loop arrangement, said closed loop arrangement being defined by said yoke fiber elements completely looping around the hole such that said first portion of each yoke fiber element crosses over said second portion, and said open loop arrangement being defined by said yoke fiber elements incompletely looping around the hole such that said first portion of each yoke fiber element does not cross over said second portion.

2. A shaft according claim 1, wherein said shaft fiber elements are inclined with respect to the longitudinal axis of the body section.

3. A shaft according to claim 2, wherein said shaft fiber elements have sections extending parallel to the axis of said body section in order to reduce an angle of said bend formed by a specific shaft fiber element located to the outside of each shaft fiber layer and said yoke fiber element connected to said specific shaft fiber element.

4. A shaft according to claim 1, wherein said shaft fiber layers and yoke fiber layers are the same in number and the number is within the range of four to twenty.

5. A shaft according to claim 1, wherein the hole has a longitudinal axis related orthogonally to the longitudinal axis of said body section and said shaft fiber elements of a given layer are symmetrical with respect to a plane containing both of said longitudinal axes.

6. A shaft according to claim 1, wherein a predetermined number of said yoke fiber layers include both said open loop arrangement and said closed loop arrangement within the same layer.

7. A shaft according to claim 6, wherein said opposite ends of each yoke fiber element of said closed loop arrangement in said yoke fiber layers are connected to said shaft fiber elements located to the outside of each shaft fiber layer to narrow the width of said yoke section.

8. A shaft according to claim 1, wherein the hole has a longitudinal axis related orthogonally to the longitudinal axis of said body section and said yoke fiber elements of said open loop arrangement are symmetrical with respect to a plane containing both of said longitudinal axes.

9. A shaft according to claim 1, wherein said yoke fiber elements and each connecting portion of said shaft fiber elements respectively have connecting points in a layer formed by said shaft fiber layer and said yoke fiber layer, said connecting points being shifted axially along the body section.

10. A shaft according to claim 1, wherein each said shaft fiber layer includes shaft fiber elements parallel to the longitudinal axis of the body section.

11. A shaft according to claim 10 including layers wherein the number of shaft fiber elements is twice as great as the number of yoke fiber elements.

12. A shaft according to claim 1 further comprising a hoop disposed between the body section and the yoke section, circumferentially around the shaft.

13. A shaft according to claim 1 further comprising a heat-shrinkable material wound on the body section in layer form.

14. A shaft according to claim 1, wherein said filament is made of a material selected from a group consisting of carbon fiber, aramid fiber, and glass fiber.

15. A shaft according to claim 14, wherein said plastic is made of a material selected from a group consisting of epoxy resin, vinyl ester resin, unsaturated polyester resin, polyether ether ketone and nylon.

16. A shaft according to claim 1, wherein the ratio of said open loop arrangement in all the fiber layers is in the range of 20% to 100% and the ratio of said closed loop arrangement is in the range of 80% to none.

17. A shaft according to claim 16, wherein the ratio of said open loop arrangement in all the fiber layers is in the range of 55% to 70% and the ratio of the closed loop arrangement is in the range of 45% to 30%.

18. A shaft according to claim 17, wherein the ratio of said open loop arrangement in all the fiber layers is in the range of 60% to 65% and the ratio of said closed loop arrangement is in the range of 40% to 35%.

19. A shaft having a longitudinal body section and a yoke section formed with at least one end of the body section, said yoke section having a hole with a longitudinal axis related orthogonally to the longitudinal axis of said body section, and said body section and said yoke section being integrally made of a fiber reinforced composite material including a filament and a plastic adhered to the filament, said shaft comprising:

a plurality of shaft fiber layers forming said body section, each shaft fiber layer including a plurality of shaft fiber elements disposed at predetermined intervals, said shaft fiber elements being inclined with respect to said longitudinal axis of the body section;

a plurality of yoke fiber layers forming the yoke section, each yoke fiber layer including a plurality of yoke fiber elements, each yoke fiber element having a first portion and a second portion, each portion having ends connected to associated shaft fiber elements; and wherein each yoke fiber element has at least one of a closed loop arrangement and an open loop arrangement, said closed loop arrangement being defined by said yoke fiber elements completely looping around the hole such that said first portion of each yoke fiber element crosses over said second portion of each yoke fiber element, and said open loop arrangement being defined by said yoke fiber elements incompletely looping around the hole such that said first portion of each fiber element does not cross over said second portion, said yoke fiber elements of said open loop arrangement being disposed symmetrically with respect to a plane containing both of said longitudinal axes.

20. A shaft according to claim 19, further including a curved fiber element connecting each shaft fiber element to each yoke fiber element.

21. A shaft according to claim 19, further including a fiber element wound around the body section to connect each shaft fiber element and each yoke fiber element.

22. A shaft according to claim 19, wherein said shaft fiber layers and yoke fiber layers are the same in number and wherein the number is within the range of four to twenty.

23. A shaft according to claim 22, wherein said yoke fiber elements and shaft fiber elements respectively have connecting points in a layer including the shaft fiber layer and the yoke fiber layer, said connecting points being located at the yoke section side or on a boundary between the body section and the yoke section.

24. A shaft having a body section and a yoke section, formed by using a mandrel including a mandrel body, a support pin penetrating the mandrel and a plurality of pins arranged on a periphery of the mandrel body near the support pin, and by arranging a filament with a resin in a layered form on the mandrel, said shaft being formed by:

arranging an end of the filament along the mandrel body;

changing a direction of the arrangement of the filament by engaging the filament with a predetermined one of the pins and partly forming a fiber layer of the yoke section in one of an open loop arrangement and a closed loop arrangement by looping the filament about the support pin;

wherein in said closed loop arrangement, the filament is completely looped around the support pin such that a first portion of the filament crosses over a second portion of the filament, and wherein in said open loop arrangement, the filament incompletely loops around the hole such that a first portion of the filament does not cross over a second portion of the filament;

partly forming a fiber layer of the body section by arranging the filament along the periphery of the body section after changing again the direction of the arrangement of the filament by engaging the filament with a different pin than the predetermined pin, such that said filament pivots about said pin forming a predetermined angle between a portion of the filament on the body portion proximate the pivot and a portion of the filament on the yoke section proximate the pivot;

removing the pins;

curing the resin;

removing the support pins; and removing the mandrel.

25. The shaft according to claim 24, wherein said plurality of pins are smaller in their diameter than the support pin.

* * * * *